(12) United States Patent
Hara et al.

(10) Patent No.: US 10,625,589 B2
(45) Date of Patent: *Apr. 21, 2020

(54) BATTERY MOUNTING STRUCTURE FOR VEHICLE

(71) Applicant: TOYOTA JIDOSHA KABUSHIKI KAISHA, Aichi (JP)

(72) Inventors: Yasuhiro Hara, Odawara (JP); Seigo Fujishima, Miyoshi (JP); Masayoshi Ishikawa, Susono (JP); Masayuki Kitaura, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/123,692

(22) Filed: Sep. 6, 2018

(65) Prior Publication Data

US 2019/0001803 A1    Jan. 3, 2019

Related U.S. Application Data

(63) Continuation of application No. 15/487,710, filed on Apr. 14, 2017, now Pat. No. 10,099,546.

(30) Foreign Application Priority Data

Apr. 21, 2016   (JP) ................. 2016-085561

(51) Int. Cl.
*B60K 1/04*      (2019.01)
*B60L 50/60*     (2019.01)
*H01M 2/10*     (2006.01)

(52) U.S. Cl.
CPC ............... *B60K 1/04* (2013.01); *B60L 50/66* (2019.02); *H01M 2/1083* (2013.01);
(Continued)

(58) Field of Classification Search
CPC .............. B60K 1/04; B60K 2001/0405; B60K 2001/0438; B60L 11/1877; B60L 11/1851;
(Continued)

(56) References Cited

U.S. PATENT DOCUMENTS 7,695,865 B2 *   4/2010   Saito .................... H01M 4/0404
                                                                     429/209
7,951,478 B2 *   5/2011   Takamatsu .......... H01M 10/615
                                                                      429/120

(Continued)

FOREIGN PATENT DOCUMENTS

JP       H6-115362 A      4/1994
JP       2005-183287 A    7/2005
(Continued)

*Primary Examiner* — John D Walters
(74) *Attorney, Agent, or Firm* — Hauptman Ham, LLP

(57) ABSTRACT

A battery mounting structure to enhance rigidity of a vehicle body without increasing a vehicle weight is provided. The battery mounting structure comprises a pair of frame members extending longitudinally and a battery pack an all-solid battery having a cell stack. The battery pack is disposed between the frame members. The battery pack is connected to the frame member through a connection member.

19 Claims, 5 Drawing Sheets

(52) U.S. Cl.
CPC ... *B60K 2001/0438* (2013.01); *B60Y 2306/01* (2013.01); *H01M 2220/20* (2013.01)

(58) Field of Classification Search
CPC ... B60L 50/66; H01M 2/1083; H01M 2/1072; H01M 2200/20; B60Y 2306/01
USPC ........................................................ 180/68.5
See application file for complete search history.

(56) References Cited

U.S. PATENT DOCUMENTS

| | | | | |
|---|---|---|---|---|
| 8,561,743 B2* | 10/2013 | Iwasa | ........................ | B60K 1/04 |
| | | | | 180/68.5 |
| 8,936,125 B2* | 1/2015 | Nakamori | ................ | B60K 1/04 |
| | | | | 180/68.5 |
| 8,939,246 B2* | 1/2015 | Yamaguchi | .............. | B60K 1/04 |
| | | | | 180/68.5 |
| 2005/0132562 A1 | 6/2005 | Saito et al. | | |
| 2011/0297467 A1 | 12/2011 | Iwasa et al. | | |
| 2012/0282507 A1 | 11/2012 | Andre et al. | | |
| 2014/0338999 A1* | 11/2014 | Fujii | ........................ | B60K 1/04 |
| | | | | 180/68.5 |

FOREIGN PATENT DOCUMENTS

| | | |
|---|---|---|
| JP | 2006-335243 A | 12/2006 |
| WO | 2010/098271 A1 | 9/2010 |

* cited by examiner

BATTERY MOUNTING STRUCTURE FOR VEHICLE

CROSS REFERENCE TO RELATED APPLICATIONS

The present application is a continuation of U.S. application Ser. No. 15/487,710 filed Apr. 14, 2017, which claims the benefit of priority to Japanese Patent Application No. 2016-085561 filed on Apr. 21, 2016 with the Japanese Patent Office, the entire contents of which are incorporated herein by reference in its entirety.

BACKGROUND

Field of the Disclosure

Embodiments of the present application relate to the art of a structure for mounting a battery for storing electrical energy in a vehicle

Discussion of the Related Art

PCT international publication No. 2010/098271 describes one example of a battery mounting structure in vehicles. According to the teachings of PCT international publication No. 2010/098271, a battery assembly is disposed under a floor panel of a vehicle. Specifically, a pair of parallel side members extends in a longitudinal direction under a floor panel. Front ends of the side members are fixed to a cross member extending in the vehicle transverse direction, and rear ends of rear side members are fixed to a rear cross member. The battery assembly including a plurality of cell stacks is fitted into a frame formed of the pair of side members, the cross member, the pair of rear side members, and the rear cross member from a lower side.

Thus, in the battery mounting structure taught by PCT international publication No. 2010/098271, the battery assembly is held is the frame formed of side members and the cross members. The battery assembly includes a controller such as a converter etc., and hence weight of the battery assembly is rather heavy. In order to ensure rigidity of a vehicle body while holding the battery assembly, the side members and the cross members forming the frame are required to have sufficient rigidity. To this end, large members have to be used to form the frame, and a vehicle weight may be increased.

SUMMARY

Aspects of the present disclosure have been conceived noting the foregoing technical problems, and it is therefore an object of the present disclosure is to provide a battery mounting structure to enhance rigidity of a vehicle body without increasing a vehicle weight.

Embodiments of the present disclosure relate to a battery mounting structure for a vehicle, comprising: a pair of frame members extending in a longitudinal direction of the vehicle while maintaining a predetermined clearance therebetween in a width direction of the vehicle; and a battery pack having a cell stack formed of a plurality of single cells that is disposed between the frame members. In order to achieve the above-explained objective, according to the present disclosure, an all-solid battery having a solid electrolyte is used as the battery module. In the battery mounting structure, a connection member is situated outer side of the battery pack in a width direction of the vehicle, and the battery pack is connected to the frame member through the connection member.

In a non-limiting embodiment, the battery pack may be overlapped with at least a portion of the frame member in a vertical direction of the vehicle, and may be fixed to the frame member in such a manner that the single cells are juxtaposed in the width direction of the vehicle.

In a non-limiting embodiment, a plurality of the battery packs may be juxtaposed in the longitudinal direction of the vehicle. Each of the battery packs may be fixed individually to the frame member through the connection member at a plurality of points isolated away from each other in the longitudinal direction of the vehicle. In addition, the connection member may be integrated with the battery module to connect the battery module directly to the frame member.

In a non-limiting embodiment, the battery module may include a pair of end plates situated on width ends of the cell stack to hold the cell stack, and a bundling member that bundles the cell stack held by the end plates.

In a non-limiting embodiment, a sidewall of the casing and an outer face of the battery module may extend in the vertical direction parallel to each other in the battery pack. In addition, the battery pack may be disposed underneath the floor panel or on the floor panel.

Thus, according to the embodiment of the present disclosure, an all-solid battery having a solid electrolyte is used as the battery module, and the battery pack is connected to the frame member through the connection member situated outer side of the battery pack in a width direction of the vehicle. According to the embodiment of the present disclosure, therefore, a collision impact applied to the frame member from the side of the vehicle may be transmitted to the all-solid battery serving as a reinforcement member through the connection member. Since the all-solid battery is thus used as the reinforcement member, rigidity of a vehicle body against the collision impact applied from the side of the vehicle may be enhanced. In addition, another reinforcement members such as a a cross member etc. may be omitted to lighten a vehicle weight without reducing the rigidity of the vehicle body.

Since the battery pack is overlapped with a portion of the frame member in a vertical direction, the collision impact applied to the frame member from the side of the vehicle may be transmitted certainly to the all-solid battery.

Since the battery pack is fixed to the frame member in such a manner that the single cells are juxtaposed in the width direction of the vehicle, the rigidity of the vehicle body against the collision impact applied from the side of the vehicle may be further enhanced.

Since a plurality of the battery packs are juxtaposed in the longitudinal direction, the rigidity of the vehicle body against the collision impact applied from the side of the vehicle may be further enhanced.

Since the battery pack is fixed to the frame member through the connection member at a plurality of points, a rotation of the frame member around the fixing point and a displacement of the frame member in the longitudinal direction in the event of side collision may be prevented.

Since the connection member is integrated with the battery module to connect the battery module directly to the frame member, the collision impact applied to the frame member from the side of the vehicle may be transmitted directly to the all-solid battery.

Since the cell stack is bundled by the end plates and bundling member, rigidity of the battery module may enhanced to further enhance the rigidity of the vehicle body against the collision impact applied from the side of the vehicle.

Since the sidewall of the casing and the outer face of the battery module extend in the vertical direction parallel to each other, the collision impact applied to the frame member from the side of the vehicle may be transmitted further certainly to the all-solid battery.

Since the battery pack is disposed underneath the floor panel or on the floor panel, deformation of the floor panel in the event of side collision may be prevented by the battery pack.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
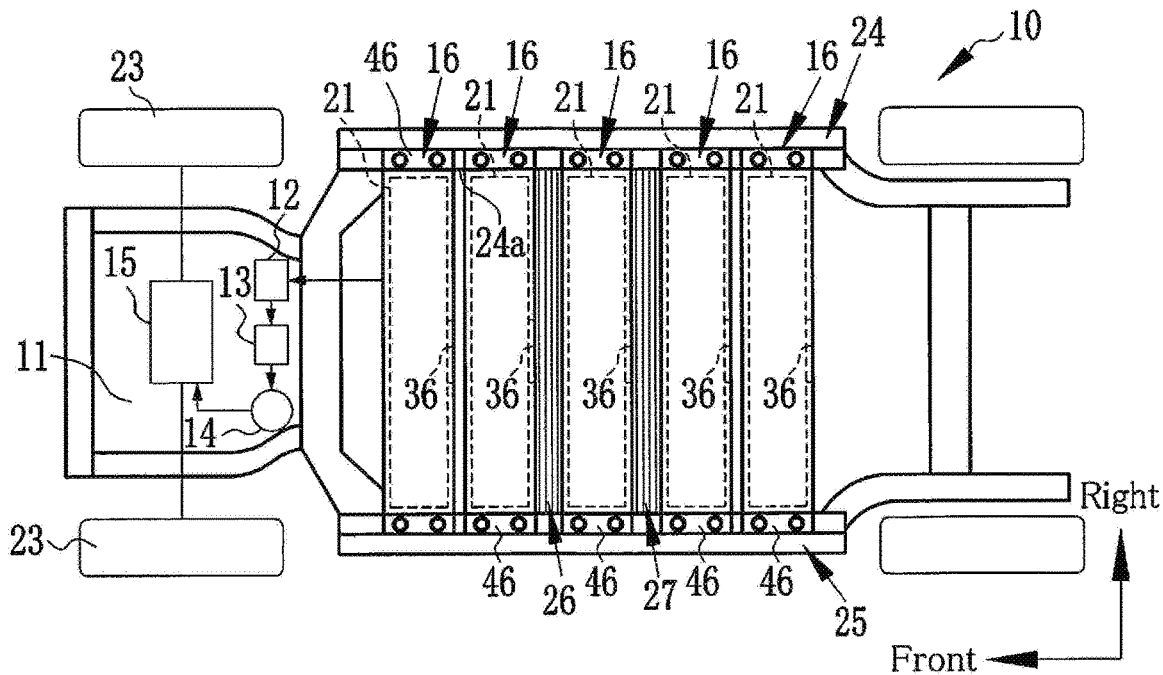
FIG. 1 is a schematic illustration showing one example of a structure of the vehicle to which the battery mounting structure according to the present disclosure is applied.

Hereinafter, embodiments of the present disclosure will be explained with reference to the accompanying drawings. Turning now to FIG. 1, there is shown one example of a structure of a vehicle to which the battery mounting structure according to the present disclosure is applied. In the vehicle 10 shown in FIG. 1, a converter 12, an inverter 13, a motor 14, and a power transmission unit 15 are arranged in a front compartment 11, and battery packs 16 as secondary batteries are arranged under a floor panel. The battery pack 16 includes a cuboid casing 46 and a battery module 21 formed of a stack of single cells held in the casing 46. The converter 12 is adapted to increase a voltage from the battery modules 21, and to apply the voltage to the inverter 13 while stabilizing. The inverter 13 converts the direct current supplied from the battery modules 21 into the alternate current while controlling frequency. The power transmission unit 15 transmits torque of the motor 14 to front wheels 23 while increasing or decreasing. Here, the inverter 13 may also be connected directly to the battery modules 21 while omitting the converter 12.

In the vehicle 10, a right side sill 24 and a left side sill 25 as frame members extend on both sides of the vehicle 10, and the battery packs 16 are juxtaposed in the longitudinal direction of the vehicle 10 at regular intervals between the right side sill 24 and the left side sill 25. Each of the battery modules 21 has a cuboid shape, and width ends of the battery modules 21 are individually attached to the right side sill 24 and the left side sill 25. In the vehicle 10, those battery modules 21 serve as reinforcement members to enhance rigidity of the vehicle 10 against a collision impact or a collision load applied to the vehicle from the side. In order to further reinforce the right side sill 24 and the left side sill 25, a first floor cross member 26 and a second floor cross member 27 are disposed laterally underneath a flor panel between the right side sill 24 and the left side sill 25 while keeping a predetermined clearance therebetween in the longitudinal direction. Right ends of the first floor cross member 26 and the second floor cross member 27 are attached to intermediate portions of the right side sill 24, and left ends of the first floor cross member 26 and the second floor cross member 27 are attached to intermediate portions of the left side sill 25. Here, it is to be noted that the numbers of the battery packs may be altered arbitrarily according to need. In addition, the floor cross members may be omitted if it is unnecessary.

Figure 2:
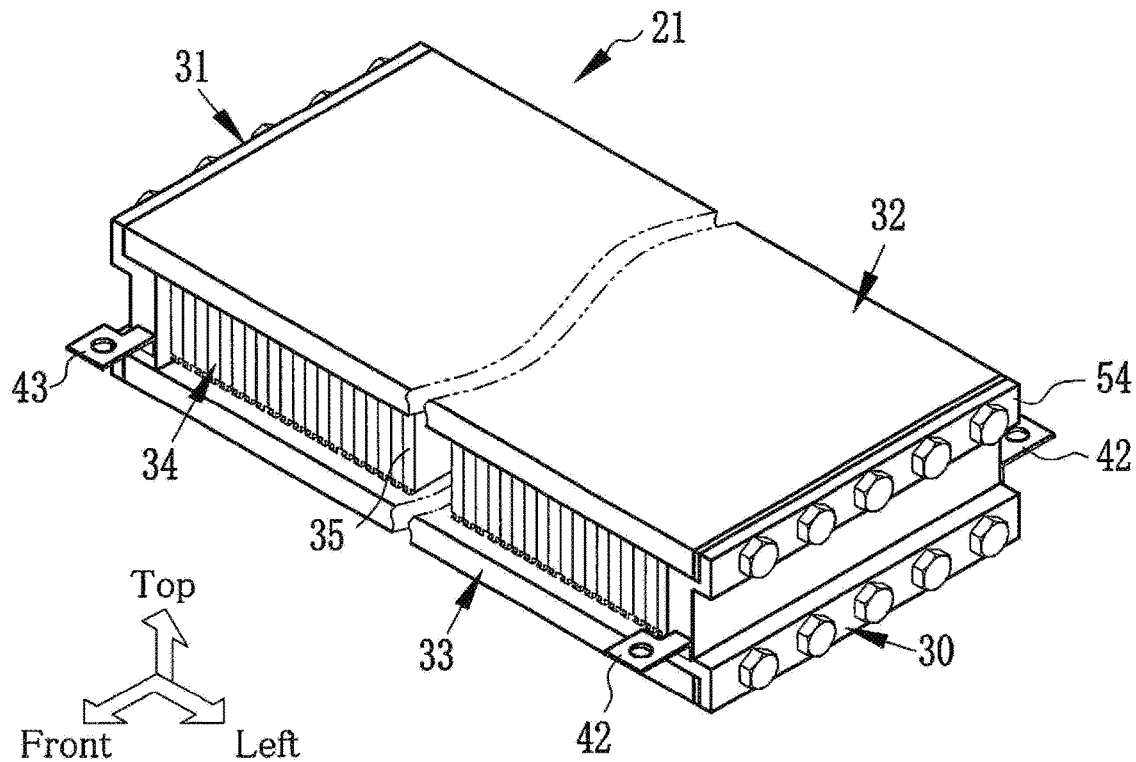
FIG. 2 is a perspective view showing one example of the battery module.

FIG. 2 is a perspective view showing one example of the battery module 21. As illustrated in FIG. 2, the battery module 21 comprises a first end plate 30, a second end plate 31, a first tension plate 32, a second tension plate 33, and a cell stack 34. Thus, each of the battery modules 21 has a cuboid shape, and individually arranged in the vehicle 10 in such a manner that the long sides extend in the width direction and that the first end plate 30 and the second end plate 31 extend in the longitudinal direction.

Figure 3:
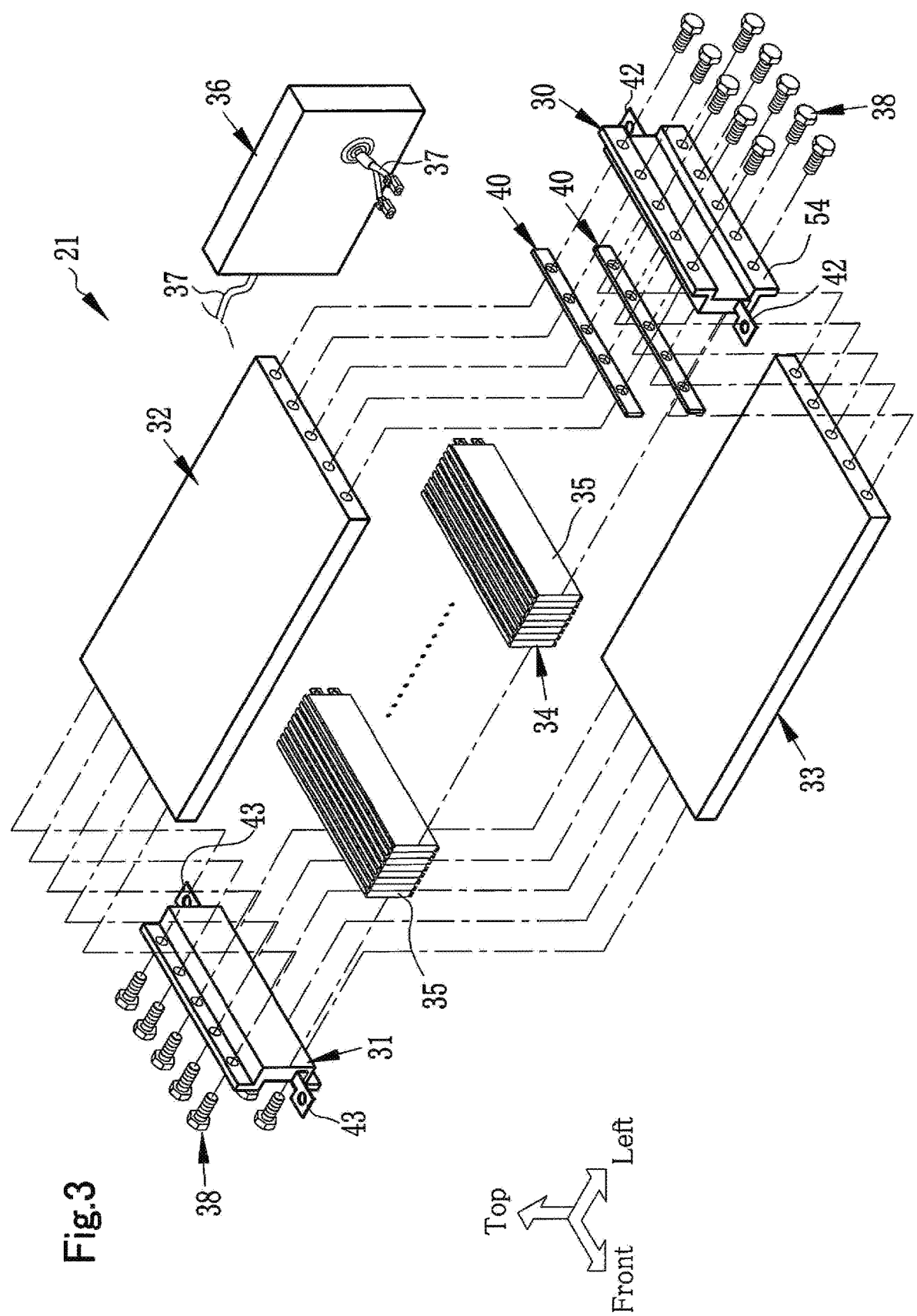
FIG. 3 is an exploded view of the battery module shown in FIG. 2.

Components of the battery module 21 as an all-solid battery are shown in FIG. 3 in more detail. As illustrated in FIG. 3, the cell stack 34 is formed of a plurality of flat rectangular single cells 35 juxtaposed in the width direction of the vehicle 10. Although the single cells 35 are juxtaposed in the width direction of the vehicle 10 in FIG. 3, the direction to juxtapose the single cells 35 should not be limited to the specific direction.

Each of the single cell 35 includes a pair of electrodes and a solid electrolyte interposed between the electrodes (neither of which are shown). The single cells 35 forming the cell stack 34 are connected in series through a cable 37, and the battery module 21 outputs electrical power in accordance with the number of the single cells 35 through a pair of electrodes exposed to outside. Here, in FIG. 3, only a part of the cable 37 is depicted for the sake of illustration. The single cells 35 are electrically connected with a battery ECU 36 through the cable 37, and the battery ECU 36 is configured to stabilize the power output of the single cell 35 while observing voltage. For example, a cable comprising a bundle of copper wires and a wire insulation made of thermally and frictionally resistant resin covering the bundle of wires may be used as the cable 37. As illustrated in FIG. 1, specifically, the battery ECU 36 is attached to a front face or a rear face of the cell stack 34 in the longitudinal direction of the vehicle 10. The battery packs 16 are connected in parallel with each other to achieve a required capacity to operate the motor 14.

The first end plate 30 and the second end plate 31 are made of solid material, and situated on both width ends of the cell stack 34. The first tension plate 32 is attached to the first end plate 30 and the second end plate 31 above the cell stack 34 by screwing bolts 38 into bores of the first end plate 30 and bores of the second end plate 31. Likewise, the second tension plate 33 is attached to the first end plate 30 and the second end plate 31 below the cell stack 34 by screwing bolts 38 into bores of the first end plate 30 and bores of the second end plate 31. In order to adjust a clamping force for bundling the cell stack 34 by the first end plate 30 and the second end plate 31, a shim 40 is individually interposed between the first end plate 30 and the first tension plate 32, and between the first end plate 30 and the second tension plate 33. To this end, a thickness of the shim 40 may be adjusted in such a manner as to achieve a desired clamping force. Since the solid electrolyte is employed in the battery module 21, liquid spill will not occur in the battery module 21. In addition, since most of the components of the battery module 21 are made of solid material, a shock resistance of the battery module 21 is enhanced. The first end plate 30 is provided with a pair of fixing plates 42 at both ends and the second end plate 31 is provided with a pair of fixing plates 43 at both ends so that the battery module 21 is fixed to the casing 46 made of insulation material through the fixing plates 42 and 43. Thus, in the battery module 21, the first tension plate 32, the second tension plate 33, and the bolts 38 serve as a bundling member.

Figure 4:
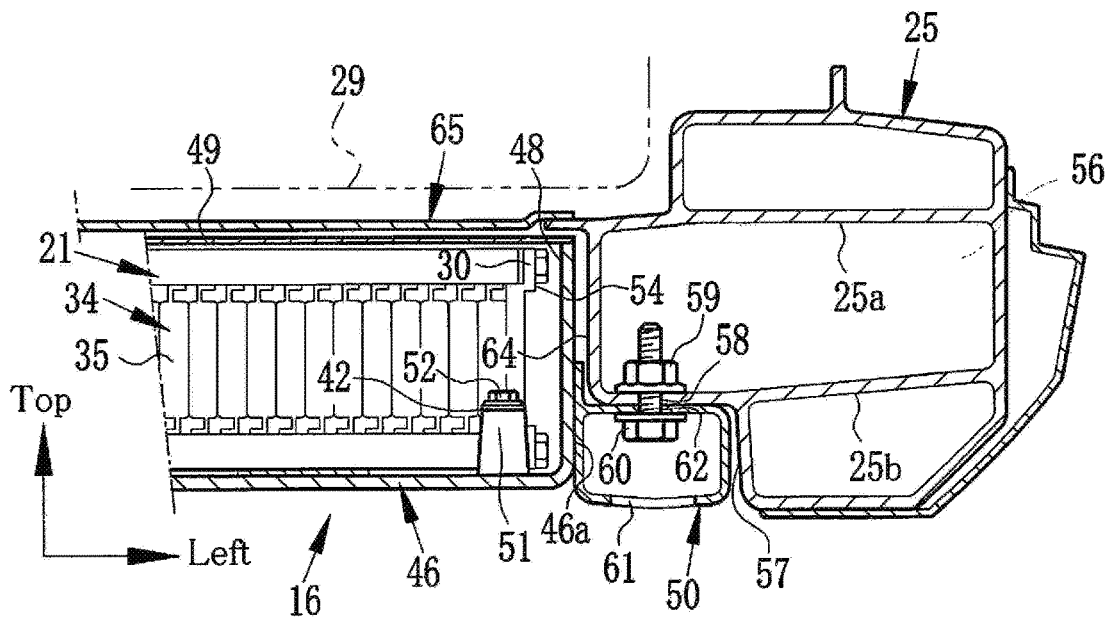
FIG. 4 is a cross-sectional view showing one example of the battery mounting structure.

Turning to FIG. 4, there is shown one example of the battery mounting structure. As illustrated in FIG. 4, the battery pack 16 includes the battery module 21, the casing 46 and a flat lid 49 closing an opening 48 of the casing 46, and a connection member 50 is attached to an outer face of a sidewall 46a of the casing 46. Specifically, the connection member 50 is a hollow frame member extending in the longitudinal direction of the vehicle 10, and attached entirely to the outer face of the sidewall 46a of the casing 46. A floor panel 65 is deposed above the lid 49 of the battery pack 16. Specifically, a left side end of the floor panel 65 is disposed on an inner flange protruding inwardly from an upper partition 25a of the left side sill 25, and a right side end of the floor panel 65 is disposed on an inner flange protruding inwardly from an upper partition (not shown) of the right side sill 24.

The fixing plates 42 of the first end plate 30 are fixed to installation members 51 erected on a bottom of the casing 46 by bolts 52. Although not illustrated in FIG. 4, the fixing plates 43 of the second end plate 31 are also fixed to the installation members 51 by the bolts 52. In the casing 46 in which the battery module 21 is thus fixed to the bottom thereof, the sidewall 46a of the casing 46 and an outer face 54 of the first end plate 30 extend in the vertical direction substantially parallel to each other.

In order to lighten the vehicle weight while ensuring rigidity, each of the right side sill 24 and the left side sill 25 may be formed integrally using light aluminum alloy by an extrusion method in such a manner as to maintain a hollow space 56 therein. A lower inner corner of the left side sill 25 is depressed to form a depression 57. In the depression 57 an installation hole 58 is formed on a lower partition wall 25b, and a nut 59 is welded to an upper face of the lower partition wall 25b around the installation hole 58. An installation hole 62 is also formed on a top wall of the connection member 50 underneath the installation hole 58 of the lower partition wall 25b, and a bolt 60 is screwed into the installation hole 62 and the installation hole 58 through an opening 61. The right side sill 24 is also fixed to the right side of the battery pack 16 in a similar fashion.

Figure 5:
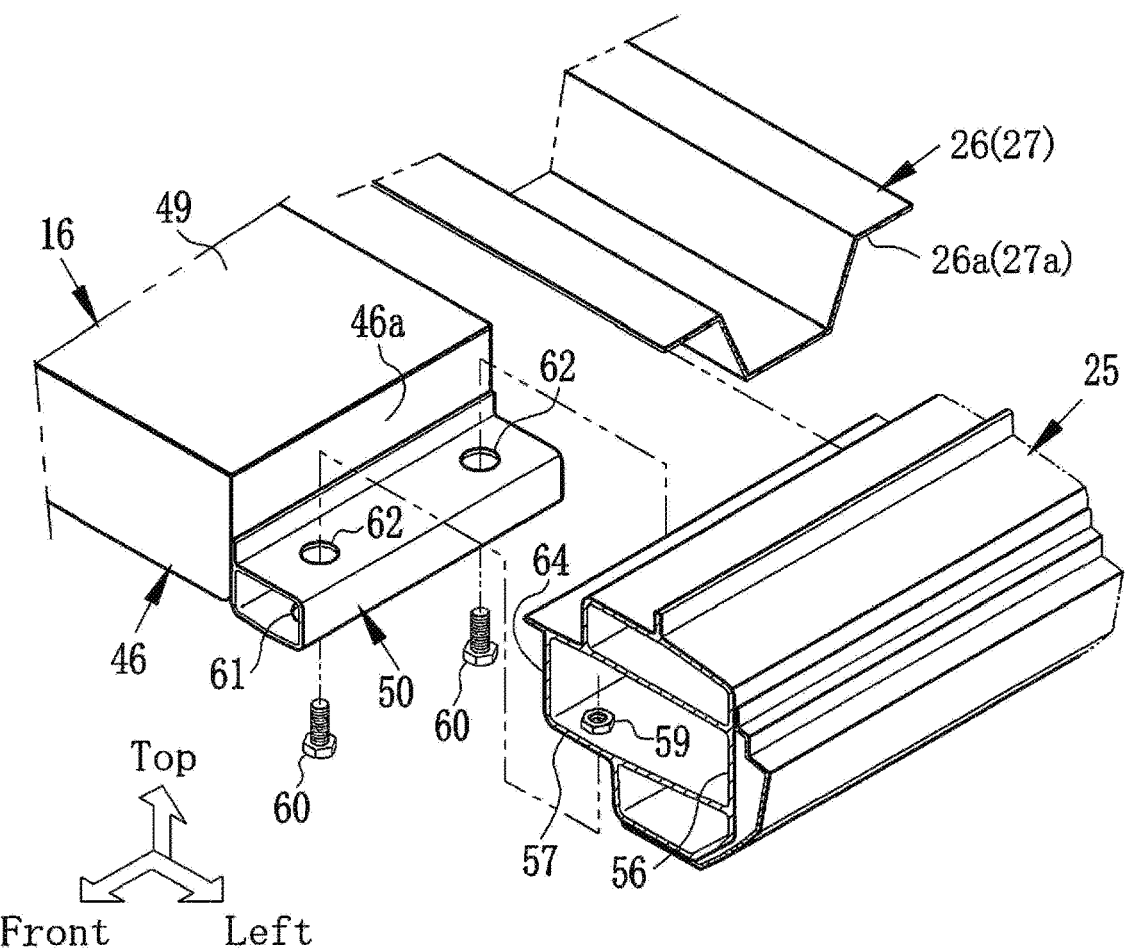
FIG. 5 is a perspective view showing a connection between the battery pack and the side sill in the battery mounting structure shown in FIG. 4.

Connection between the battery pack 16 and the left side sill 25 is shown in more detail in FIG. 5. As illustrated in FIG. 5, in the connection member 50, two installation holes 62 are formed above the opening 61. After fixing the battery pack 16 to the left side sill 25 by screwing the bolts 60 into the installation holes 62, the sidewall 46a of the casing 46 and an inner sidewall 64 of the left side sill 25 extend in the vertical direction substantially parallel to each other. That is, the sidewall 46a of the casing 46 is overlapped with at least a portion of the left side sill 25 e.g., with the inner sidewall 64 in the vertical direction of the vehicle 10. Although a predetermined clearance is maintained between the sidewall 46a and the inner sidewall 64 in FIG. 5, the sidewall 46a and the inner sidewall 64 may also be contacted to each other. Since the sidewall 46a of the casing 46 is overlapped with the inner sidewall 64 of the left side sill 25, a collision impact applied to the left side sill 25 from the side of the vehicle 10 may be transmitted to the cell stack 34 serving as a lateral reinforcement member through the sidewall 46a of the casing 46. In addition, since the sidewall 46a and the inner sidewall 64 extend vertically parallel to each other, the collision impact applied to the left side sill 25 from the side of the vehicle 10 may be transmitted to the cell stack 34 effectively. For this reason, an inward deformation of the vehicle body may be reduced even if the collision impact is applied to the left side sill 25 from the side of the vehicle 10. Further since the battery pack 16 is fixed to the left side sill 25 at two points isolated away from each other in the longitudinal direction of the vehicle 10, a rotation of the left side sill 25 around the fixing point and a displacement of the left side sill 25 in the longitudinal direction in the event of side collision may be prevented. As described, the right side sill 24 is also fixed to the right side of the battery pack 16 in a similar fashion.

The floor cross member 26 (27) is a plate member in which a width center is depressed entirely lengthwise, and end portions 26a (27a) are fixed to the right side sill 24 and the left side sill 25 so as to support the floor panel 65 from below. The connection member 50 is also interposed between the right side end of the battery pack 16 and the right side sill 24. Optionally, a front end of the battery pack 16 may also be connected to a front cross member (not shown) through the connection member 50, and a rear end of the battery pack 16 may also be connected to a rear cross member (not shown) through the connection member 50.

Figure 6:
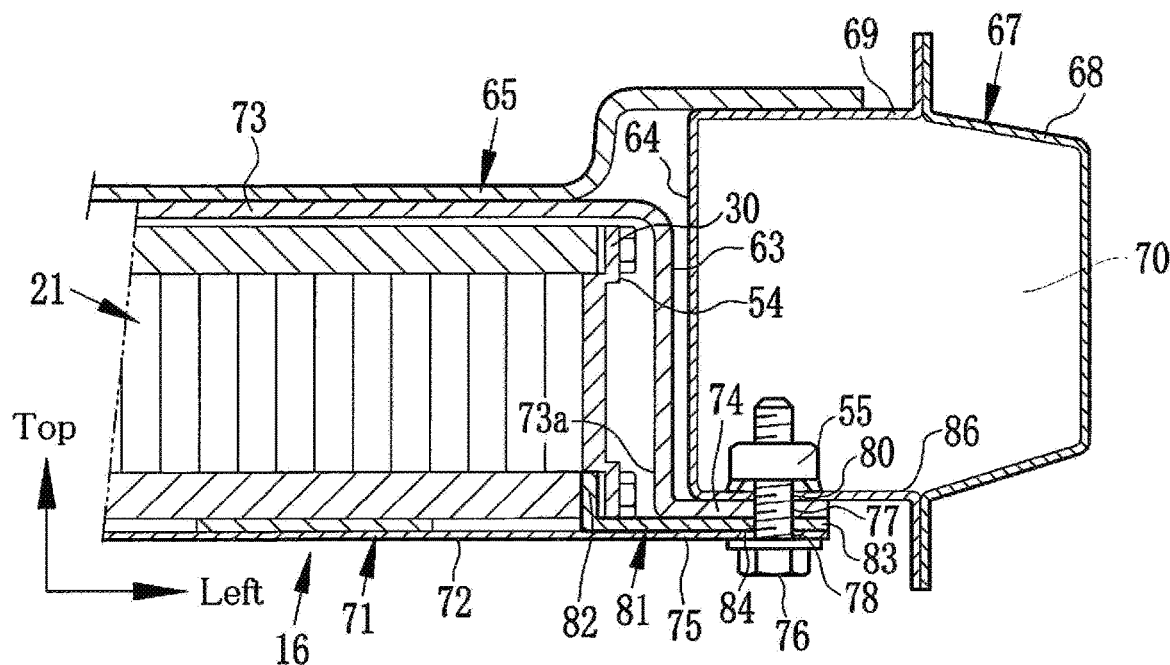
FIG. 6 is a cross-sectional view showing another example of the battery mounting structure.

Turning to FIG. 6, there is shown another example of the battery mounting structure in which the battery module 21 is attached to a left side sill 67. According to another example, an outer side sill 68 and an inner side sill 69 are coupled to form the left side sill 67 in such a manner as to create a hollow internal space 70 in the left side sill 67. A casing 71 comprises a bottom 72 on which the battery modules 21 are disposed, and a lid 73 covering the width ends and the top faces of the battery modules 21. An installation portion 75 formed on the left end of the bottom 72 extends underneath a lower wall 86 of the inner side sill 69, and a weld nut 55 is welded on an inner surface of the lower wall 86 of the inner side sill 69 around an installation hole 80. A flange 74 protruding from an opening end 73a of the lid 73 toward the inner side sill 69, and a leading end 83 of an L-shaped connection plate 81 also protruding toward the inner side sill 69 are interposed between the installation portion 75 of the bottom 72 and the lower wall 86 of the inner side sill 69. The installation portion 75 of the bottom 72, the leading end 83 of the connection plate 81, the flange 74 of the lid 73, and the lower wall 86 of the inner side sill 69 are fixed to one another by screwing a bolt 76 into the weld nut 55 through an installation hole 78 formed on the installation portion 75, an installation hole 84 formed on the leading end 83 of the connection plate 81, an installation hole 77 formed on the flange 74 of the lid 73, and the installation hole 80 of the lower wall 86 of the inner side sill 69.

An inner end 82 of the connection plate 81 is bent upwardly to be attached to an end face of the second tension plate 33. In the battery mounting structure shown in FIG. 6, a sidewall 63 of the lid 73 and the inner sidewall 64 of the left side sill 67 extend vertically parallel to each other while keeping a predetermined clearance therebetween. Alternatively, the sidewall 63 of the lid 73 and the inner sidewall 64 of the left side sill 67 may also be contacted to each other at least partially. Also, the outer face 54 of the first end plate 30 extends in the vertical direction substantially parallel to the sidewall 63 of the lid 73. Thus, according to the example shown in FIG. 6, the sidewall 63 of the battery pack 16 is overlapped with at least a portion of the left side sill 67 e.g., with the inner sidewall 64. In the example shown in FIG. 6, accordingly, the connection plate 81, the flange 74, and the installation portion 75 serve as the connection member.

Figure 7:
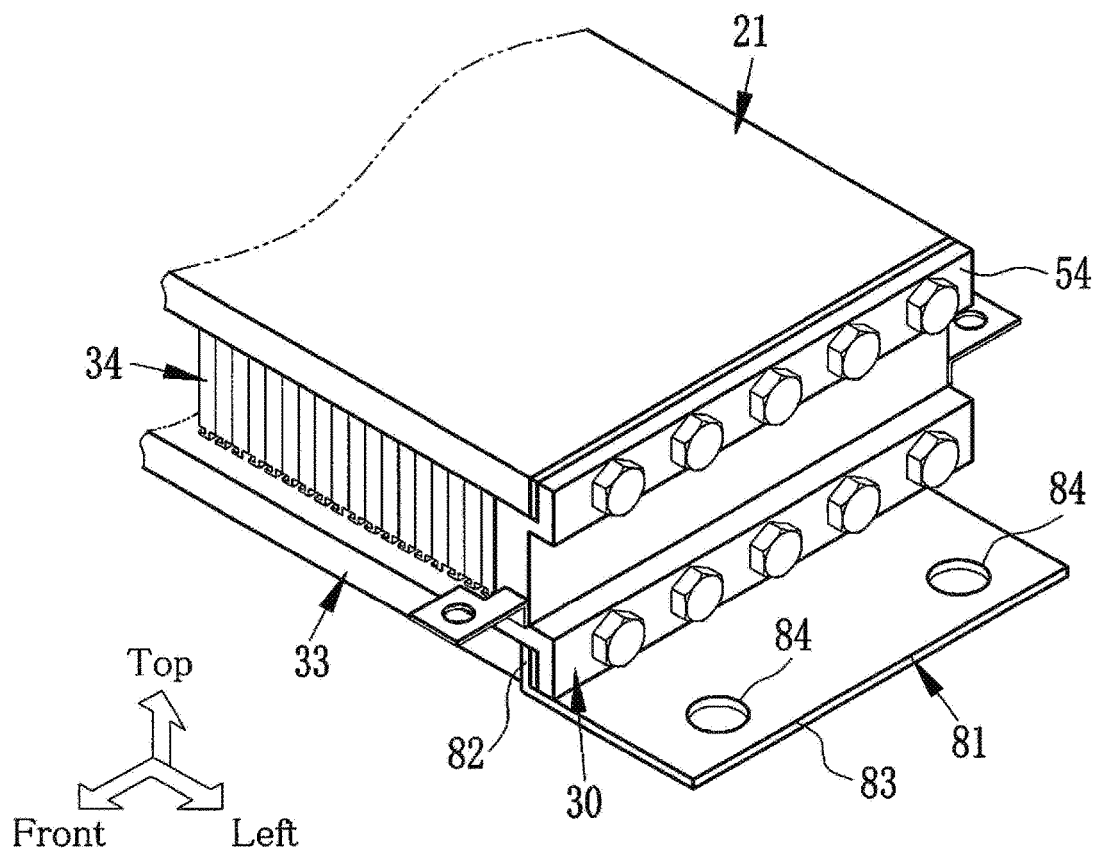
FIG. 7 is a perspective view showing a structure of the battery module used in another example shown in FIG. 6.

FIG. 7 is a perspective view showing a structure of the battery module 21 used in another example shown in FIG. 6. As illustrated in FIG. 7, the inner end 82 of the connection plate 81 is interposed between the first end plate 30 and the second tension plate 33, and two installation holes 84 are formed on the leading end 83 of the connection plate 81. Thus, according to another example, the connection plate 81 is integrated with the battery module 21 to connect the battery module 21 directly to the left side sill 67 so that the collision impact applied to the left side sill 67 may be transmitted directly to the cell stack 34. Alternatively, the connection plate 81 may also be formed integrally with the first end plate 30.

Figure 8:
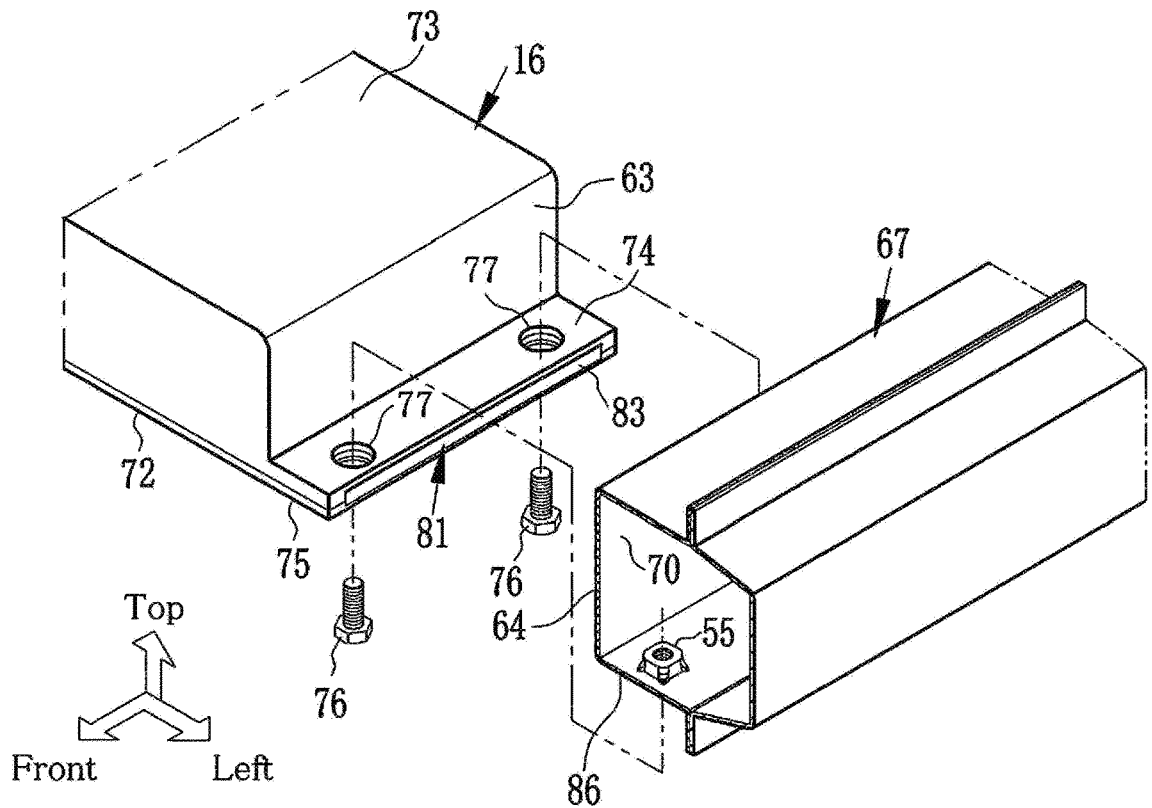
FIG. 8 is a perspective view showing a connection between the battery pack and the side sill in the battery mounting structure shown in FIG. 6.

Connection between the battery pack 16 and the left side sill 67 is shown in more detail in FIG. 8. As illustrated in FIG. 8, the leading end 83 of the connection plate 81 is interposed between the flange 74 of the lid 73 and the installation portion 75 of the bottom 72, and situated underneath to the lower wall 86 of the inner side sill 69 while being fixed thereto by screwing the bolts 76 into the weld nuts 55 at two points. Here, a right side end of the battery pack 16 is also fixed to a right side sill having a symmetrical structure as the left side sill 67 in a similar fashion.

Figure 9:
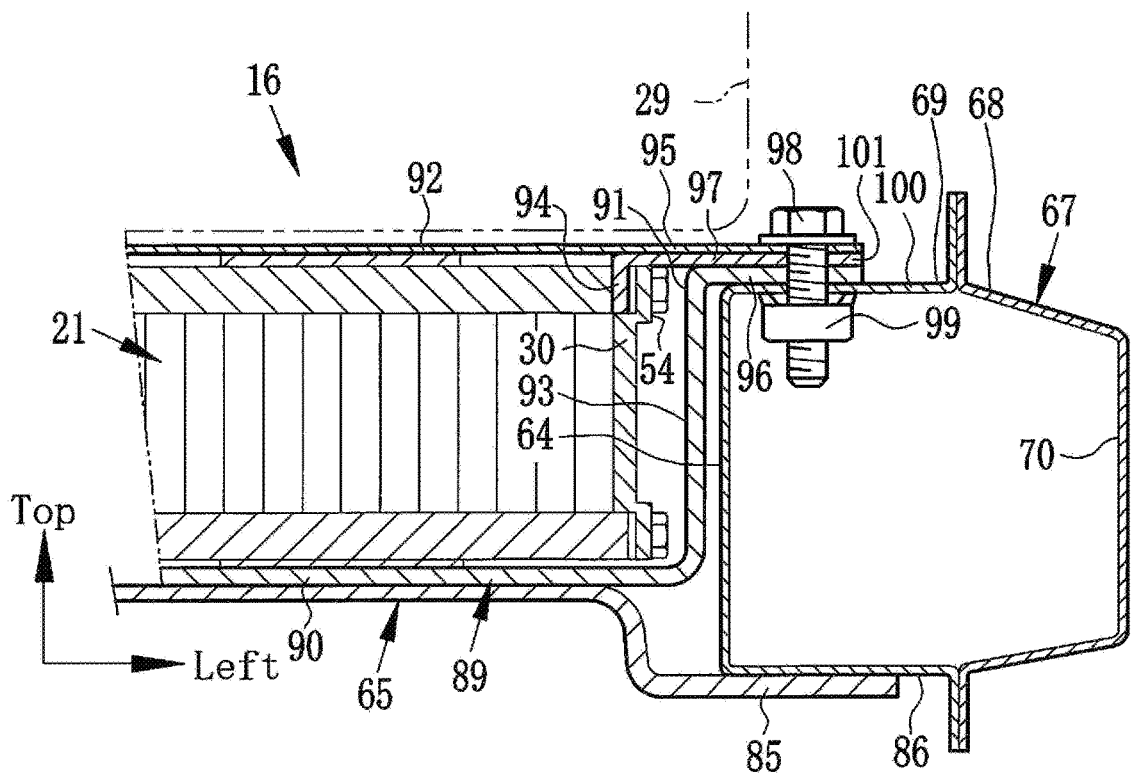
FIG. 9 is a cross-sectional view showing still another example of the battery mounting structure.

Turning to FIG. 9, there is shown still another example of the battery mounting structure in which the battery pack 16 is disposed on the floor panel 65. According to the example shown in FIG. 9, a leading end 85 of the floor panel 65 is extended toward the left side sill 67 to be fixed to the lower wall 86 of the left side sill 67. That is, the battery pack 16 is inverted. Specifically, a casing 89 comprises a bottom 90 on which the battery modules 21 are disposed, and a lid 92 closing the casing 89. In the example shown in FIG. 9, an inner sidewall 93 of the casing 89 and the outer face 54 of the first end plate 30 extend in the vertical direction substantially parallel to each other.

An installation portion 95 is extended from a leading end of the lid 92 to be overlapped on an upper wall 100 of the left side sill 67, and a weld nut 99 is welded on an inner surface of the upper wall 100 around an installation hole. A flange 96 protruding from an opening end 91 of the inner sidewall 93 toward the left side sill 67, and a leading end 101 of an L-shaped connection plate 97 also protruding toward the left side sill 67 are interposed between the installation portion 95 of the lid 92 and the upper wall 100 of the left side sill 67. The installation portion 95 of the lid 92, the leading end 101 of the connection plate 97, the flange 96 of the bottom 90, and the upper wall 100 of the left side sill 67 are fixed to one another by screwing a bolt 98 into the weld nut 55 through installation holes formed on the installation portion 95, the leading end 101 of the connection plate 97, the flange 96 of the bottom 90, and the upper wall 100 of the left side sill 67. An inner end 94 of the connection plate 97 is bent downwardly to be attached to an end face of the first tension plate 32. Thus, according to another example, the connection plate 97 provides a direct connection between the battery module 21 and the left side sill 67. In the battery mounting structure shown in FIG. 9, the sidewall 93 of the bottom 90 and the inner sidewall 64 of the left side sill 67 extend vertically parallel to each other while keeping a predetermined clearance therebetween. In addition, the sidewall 93 of the battery pack 16 is overlapped with at least a portion of the left side sill 67 e.g., with the inner sidewall 64. In the example shown in FIG. 9, the lid 92 serves as a floor of a vehicle compartment 29, and the connection plate 97, the flange 96, and the installation portion 95 serve as the connection member. Here, the right side end of the battery pack 16 is also fixed to the right side sill having a symmetrical structure as the left side sill 67 in a similar fashion.

Although the above exemplary embodiments of the present application have been described, it will be understood by those skilled in the art that the present application should not be limited to the described exemplary embodiments, and various changes and modifications can be made within the spirit and scope of the present disclosure. For example, the battery mounting structures according to the foregoing examples may also be applied to hybrid vehicles and plug-in hybrid vehicles in which a prime mover includes an engine and at least one motor.

The battery mounting structures according to the foregoing examples may also be applied to electric vehicles in which each wheel is individually driven by own motor (i.e., an in-wheel motor).

Further, the battery modules 21 may also be held in a single casing while being juxtaposed in the longitudinal direction of the vehicle. In this case, the single cells are also be juxtaposed in the width direction of the vehicle, and the end plate and the sidewall of the casing are opposed parallel to each other. Optionally, a longitudinal reinforcement member may be arranged underneath the floor panel between the side sills. In this case, two arrays of the battery packs are juxtaposed in the longitudinal direction of the vehicle on both right and left side of the longitudinal reinforcement member.

Furthermore, the battery pack may also be fixed to the side sill at one point or more than two points. In addition, the battery pack may also be fixed to the side sill by a rivet, or by welding or bonding.

What is claimed is:

1. A vehicle, comprising:
   a first frame member extending in a longitudinal direction of the vehicle;
   a second frame member extending in the longitudinal direction of the vehicle; and
   a battery module between the first frame member and the second frame member, the battery module comprising a cell stack having a plurality of single cells including an all-solid battery having a solid electrolyte in a width direction of the vehicle, the battery module being directly connected with at least one of the first frame member or the second frame member.

2. The vehicle of claim 1, wherein the battery module comprises a first end plate and a second end plate, the first end plate and the second end plate are located on both width ends of the cell stack, and at least one of the first end plate or the second end plate is connected with at least one of the first frame member or the second frame member.

3. The vehicle of claim 2, further comprising:
a connection member coupled with the first end plate or the second end plate,
wherein the battery module is directly coupled with the at least one of the first frame member or the second frame member by way of the connection member.

4. The vehicle of claim 2, further comprising:
a connection member extending from and integral with the first end plate or the second end plate,
wherein the battery module is directly coupled with the at least one of the first frame member or the second frame member by way of the connection member.

5. The vehicle of claim 2, wherein the battery module further comprises:
a first tension plate on a first side of the cell stack;
a second tension plate on a second side of the cell stack, the first tension plate and the second tension plate being separated by a distance in a height direction of the vehicle; and
a shim between the first end plate and the first tension plate, and between the first end plate and the second tension plate.

6. The vehicle of claim 5, further comprising:
a battery pack including the battery module and a casing covering the battery module,
wherein
the casing comprises a lid and a bottom,
the first end plate and the second end plate are sandwiched between the lid and the bottom, and
the lid, the bottom, the first end plate and the second end plate are connected with the at least one of the first frame member or the second frame member.

7. The vehicle of claim 2, further comprising:
a battery pack including the battery module and a casing covering the battery module,
wherein
the casing comprises a lid and a bottom,
the first end plate and the second end plate are sandwiched between the lid and the bottom, and
the lid, the bottom, the first end plate and the second end plate are connected with the at least one of the first frame member or the second frame member.

8. A vehicle, comprising:
a first frame member extending in a longitudinal direction of the vehicle;
a second frame member extending in the longitudinal direction of the vehicle; and
a battery pack comprising a battery module and a casing covering the battery module,
wherein
the battery module is between the first frame member and the second frame member,
the battery module comprises a cell stack having a plurality of single cells including an all-solid battery having a solid electrolyte in a width direction of the vehicle, a first end plate, and a second end plate,
the first end plate and the second end plate are on opposite ends of the cell stack in the width direction of the vehicle,
the casing, the first end plate, and the second end plate are connected, and
the battery pack is directly connected with at least one of the first frame member or the second frame member.

9. The vehicle of claim 8, wherein
the casing includes a sidewall coupled with at least one of the first end plate or the second end plate by at least one bolt in a height direction of the vehicle,
the battery module further comprises a first tension plate and a second tension plate on opposite sides of the cell stack in the height direction of the vehicle, and
the first tension plate and the second tension plate are connected with the first end plate and the second end plate by at least one bolt that is other than the at least one bolt coupling the sidewall of the casing with the at least one of the first end plate or the second end plate.

10. An apparatus, comprising:
a first frame member extending in a first direction;
a second frame member extending in the first direction;
a battery pack between the first frame member and the second frame member, the battery pack comprising a casing and a battery module within the casing; and
a connection member, the connection member having a first portion on a battery module side of the casing and a second portion extending toward the first frame member or the second frame member,
wherein
the battery module is coupled with at least one of the first frame member or the second frame member by way of the connection member, and
the battery module is directly coupled with at least one of the first frame member or the second frame member by way of the connection member.

11. The apparatus of claim 10, wherein the battery module comprises a plurality of cells between a pair of end plates, and the connection member is coupled with one of the end plates.

12. The apparatus of claim 11, wherein the first portion of the connection member is on a side of the end plate with which the connection member is coupled away from the first frame member or the second frame member toward which the second portion of the connection member extends.

13. The apparatus of claim 10, wherein the battery module comprises a plurality of cells between a pair of end plates, and the first portion of the connection member is one of the end plates.

14. The apparatus of claim 10, wherein the connection member comprises an L-shaped plate.

15. The apparatus of claim 10, wherein the casing and the first frame member or the second frame member with which the battery module is coupled overlap in a second direction perpendicular to the first direction.

16. The apparatus of claim 10, wherein the battery module comprises a plurality of cells between a pair of end plates, and the cells of the plurality of cells are juxtaposed in a second direction extending from the first frame member to the second frame member.

17. The apparatus of claim 10, wherein the casing comprises a flange extending toward the first frame member or the second frame member, and the flange is coupled with the first frame member or the second frame member by a fastener coupling the connection member with the first frame member or the second frame member toward which the connection member extends.

18. The apparatus of claim 10, wherein the first portion of the connection member is integrally formed with a portion of the battery module.

19. The apparatus of claim 10, wherein the battery module comprises one or more cells having a solid electrolyte.

* * * * *